United States Patent [19]

Steinwart et al.

[11] 4,253,805
[45] Mar. 3, 1981

[54] ROTARY COMPRESSOR

[75] Inventors: Johannes Steinwart, Obersulm-Willsbach; Max Ruf, Neckarsulm-Obereisesheim, both of Fed. Rep. of Germany

[73] Assignee: Audi NSU Auto Union Aktiengesellschaft, Fed. Rep. of Germany

[21] Appl. No.: 24,093

[22] Filed: Mar. 26, 1979

[30] Foreign Application Priority Data

Apr. 11, 1978 [DE] Fed. Rep. of Germany ....... 2815548

[51] Int. Cl.³ .............................................. F04C 2/00
[52] U.S. Cl. ................................ 418/54; 137/512.15; 137/856
[58] Field of Search .................... 137/512.15, 855, 856, 137/857; 418/15, 54

[56] References Cited

U.S. PATENT DOCUMENTS

| | | | |
|---|---|---|---|
| 1,197,936 | 9/1916 | Ivens | 137/512.15 |
| 3,265,085 | 8/1966 | Koehler | 137/512.15 |
| 3,301,168 | 1/1967 | Schindler et al. | 137/512.15 |
| 3,858,605 | 1/1975 | Bauer et al. | 137/512.15 |

FOREIGN PATENT DOCUMENTS 480224  11/1975  U.S.S.R. ................................... 418/54

*Primary Examiner*—Herbert Goldstein
*Attorney, Agent, or Firm*—Kane, Dalsimer, Kane, Sullivan and Kurucz

[57] ABSTRACT

A rotary compressor includes a casing 1 having a curved rotor chamber 2 in which is mounted a rotor 6. The compressor has an outlet valve 10 consisting of two valve units 10a, 10b which are located on inclined support surfaces 12 and outlet passages 11 from the chamber 2 open into the surfaces 12. Each valve unit 10a, 10b consists of a valve seat 15, a valve plate 13 and a limit plate 14, the valve seat 15 having apertures which register with passages 11 and the valve plate 13 having apertures which are staggered from the apertures in the valve seat 15. The support surfaces 12 are positioned close to the chamber 2 so that the length of the passages is small and the "dead volume" between the chamber 2 and the valve plate 13 is reduced.

6 Claims, 4 Drawing Figures

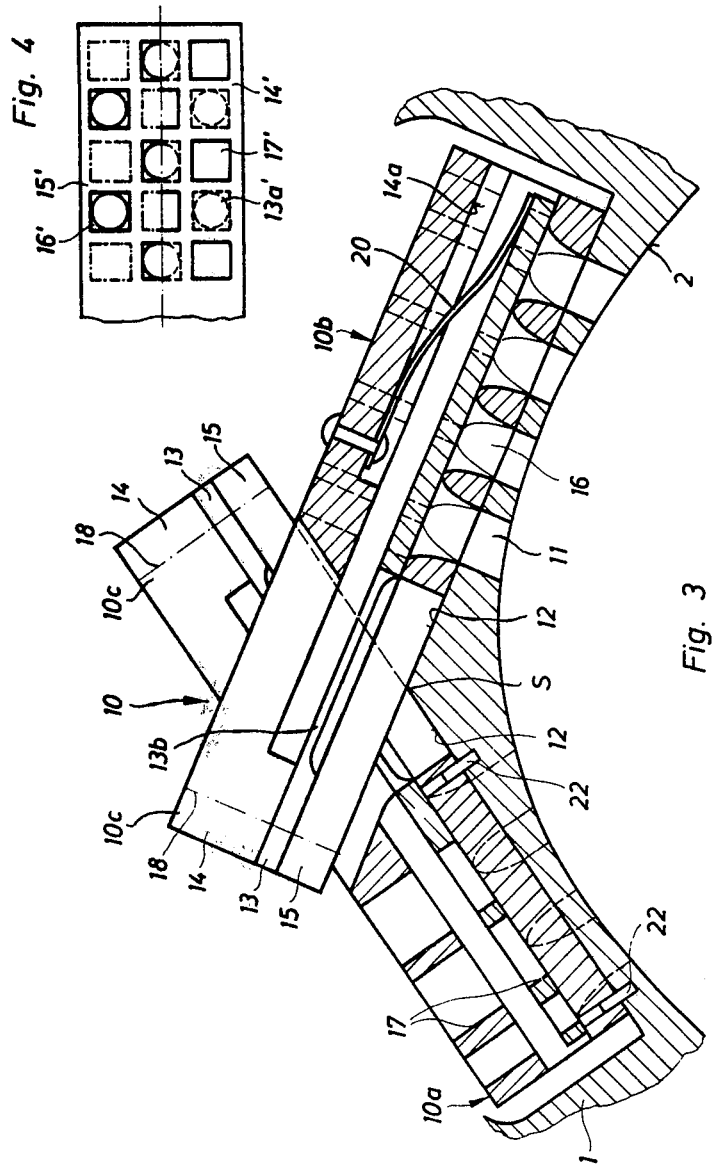

ROTARY COMPRESSOR

This invention relates to a rotary compressor and is particularly, though not exclusively, applicable to a rotary compressor having a multi-lobe or multi-vane rotor mounted on a rotary eccentric within a non-circular casing.

In a rotary compressor of the type referred to, two outlet ports might be located adjacent one another in the direction of the rotor axis but, in order to maintain the outlet flow cross sectional area as large as possible the ports would have to be widened in a circumferential direction. If each valve includes a valve plate overlying a number of passages extending radially outwards from the rotor chamber then, due to the curvature of the chamber, the distance between the ends of the valve plate and the opening of the ports into the chamber would increase. This would result in an increased "dead volume" or residual space between the ends of the valve plate and the rotor chamber, which would not be expelled through the valve during compression, but which could flow back into the chamber at the beginning of the succeeding compression stage.

The object of the present invention is to avoid or reduce the above-mentioned disadvantages, and to produce a rotary compressor which has a small dead volume and is reliable in operation.

Broadly stated, the invention consists in a rotary compressor comprising a housing with a curved rotor chamber, a rotor which defines, with the rotor chamber, variable working volumes, an outlet port located in the rotor chamber over which the rotor rides, an outlet passage communicating with the outlet port, a pair of outlet valves located in the outlet passage, and each comprising a valve plate, a limit plate which limits the distance of lift of the valve plate, and a valve seat, the valve plate, limit plate and valve seat defining apertures, the apertures in the valve seat being staggered in relation to those in the valve plate, and in which the outlet port defines a number of passages which are divided into two groups, spaced in the direction of rotation of the rotor, each group being controlled by a separate outlet valve, and two support surfaces for the two outlet valves, into which the bores open, located in the outlet passage close to the rotor chamber.

Preferably, the two support surfaces are inclined to each other and the planes of these surfaces intersect, as seen in cross section, at the apex of the included angle.

In a preferred embodiment of the invention, the valve plates of the outlet valves can be arranged comparatively close to the rotor chamber, so that on the one hand a large flow cross-section can be obtained, and on the other hand a small dead volume, which is not detrimental to the operation of the compressor, remains between the rotor chamber and the valve plate.

To produce a particularly compact construction inside the outlet passage, the parts (such as the valve plate, valve seat and limit plate) of each outlet valve can be combined into one unit or assembly which conveniently has a part extending beyond the apex of the angle, the parts being so constructed that they can penetrate or project through each other.

The part of the valve plate of each outlet valve which extends beyond the apex of the angle can be constructed as a spring tongue and attached at its free end to the valve seat and the limit plate. The spring tongue can prevent lateral movements of the valve plate. It can act at the same time as a spring for pressing the valve plate against the valve seat, the spring being designed so as to require small opening forces and to retain its elastic force almost permanently.

The valve seat can be formed from a plate which rests against the support surface in the outlet passage, and which has apertures which merge from a circular cross-section adjacent the support surface to a square cross-section adjacent the valve plate. This construction provides a comparatively large flow cross-section in the direction of the outlet passage, and makes possible a closer covering of the areas lying between the apertures of the valve seat and the valve plate. A substantially reduced flow resistance inside the outlet valve can thereby be achieved. The apertures can be arranged in an orthogonal or rectangular array, and the diagonals of the square cross-section apertures can lie parallel to the side edges of the rectangle.

The invention may be performed in various ways, and a specific embodiment, with one variation, will now be described by way of example with reference to the accompanying drawings, in which:

FIG. 3 is a cross-section through a complete outlet valve along the line III—III in FIG. 2, with the surrounding parts of the casing, whereby the two outlet valves are shown offset in the direction of the rotor axis for clarification purposes; and FIG. 4 is a top plan view similar to FIG. 2, in a second embodiment.

Figure 1:
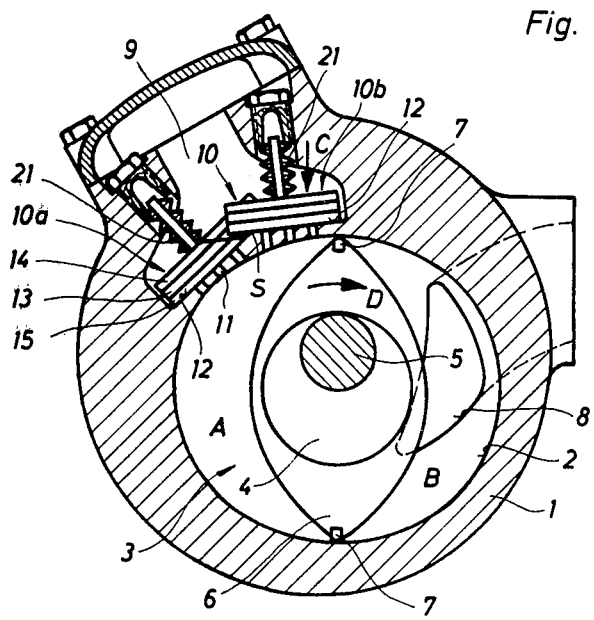
FIG. 1 is a diagrammatic sectional side elevation of a 1:2 rotary piston compressor having a trochoidal type of construction.

The rotary compressor shown in FIG. 1 has a casing 1 which includes a curved rotor chamber 2 and two parallel side walls 3, and in which a two-cornered rotor 6 is rotatably mounted on the eccentric 4 of an eccentric shaft 5. The rotor 6 carries at both its corners radially movable sealing strips 7, which during the rotation of the rotor in the arrow direction D, constantly slide along the all of the chamber 2, whereby variable working volumes A and B are formed and sealed in relation to each other. An inlet duct 8 is provided in at least one side wall 3, and an outlet passage 9 with an outlet valve 10 is provided in the casing 1. The outlet passage 9 communicates via the outlet valve 10 with a number of bores 11, which in turn communicate with the chamber 2. The sealing strips 7 located in the corners of the rotor slide over the mouths of the bores 11 during rotation of the rotor in the chamber 2. Each working volume A and B carries out successively a suction and a compression and displacement stroke when the rotor 6 rotates, the working volume B making the suction stroke and the working volume A making the compression and displacement stroke when the rotor 6 is in the position shown in FIG. 1.

The outlet valve 10 consists of two separate valve units 10a and 10b which are located on two support surfaces 12 inclined at an angle to each other close to the chamber 2 in the outlet passage 9, the bores 11 opening into these surfaces. The bores 11 are divided into two groups which are spaced in the direction of rotation of the rotor 6, each group co-operating with a respective unit 10a and 10b. Each of the units 10a and 10b is composed of a valve plate 13, a limit plate 14 which defines the lift of the valve plate, and a valve seat plate 15, which is pressed tightly against the respective support surface 12 by compression springs 21.

Figure 2:
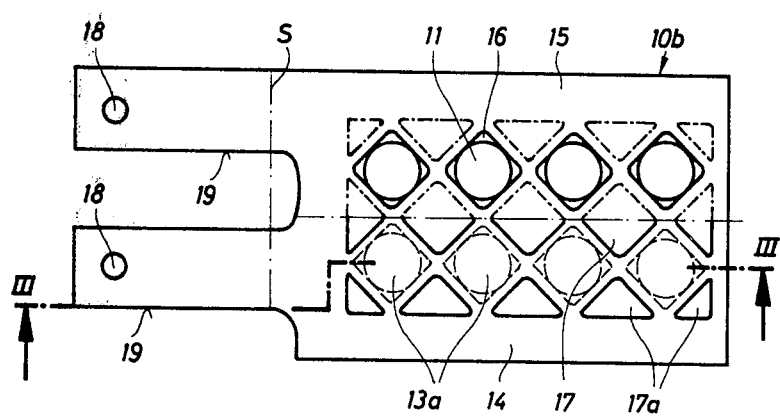
FIG. 2 is a top plan view of part of an outlet valve seen in the direction of the arrow C in FIG. 1.

Referring to FIG. 2, the valve seat 15 of unit 10b includes apertures 16 which are flush with the bores 11, as shown in the part of the drawing indicated above the horizontal dot-dash line, and the limit plate 14 and the valve plate 13 include apertures 17 which are flush with each other, as shown in the bottom part of the drawing below the horizontal dot-dash line. In order to produce as large a cross-section as possible, the apertures 17 in the limit plate 14 and the valve plate 13 have a square cross-section, the diagonals of the apertures 17 being arranged to lie parallel to the side edges of the limit plate 14. Between the edges of adjacent apertures 17, triangular apertures 17a are formed. The apertures 16 of the valve seat 15, which are flush with the bores 11 in the casing 1, have flow cross-sections which change from a circular cross-section to a square cross-section. The apertures 17 and the apertures 16 are staggered in relation to each other in such a way that the apertures 16 are covered by areas 13a of the valve plate 13 lying between the apertures 17. The dot-dash marked areas indicated on the valve seat 15 show the contours of the apertures 17 or 17a of the valve plate 13 which rest against the valve seat 15. As a result of this arrangement, a comparatively small flow resistance occurs between the apertures 16 and the apertures 17 when the valve plate 13 is raised from the valve seat 15. This arrangement also has the advantage that the bores 11 each lie close behind each other in a row, and at a distance from the side edges of the limit plate 14, whereby the bores 11 also have a corresponding spacing from the side walls 3, so that, for example, the partitions of the corner members, with multiple-part sealing strips 7 cannot slide across the bores 11. The profiled cross-sections of the apertures 16 and the apertures 17 and 17a can be produced by spark eroding, for example.

Each unit 10b and 10a, is extended beyond the sectional vertex S of the two inclined surfaces 12—to the left of the FIG. 2 in the case of the unit 10 b. On each of these sections 10c the valve plate 13, the limit plate 14 and the valve seat 15 are firmly connected together. Each section 10c has a slot 19 which is staggered in such a way that the section 10c of each unit 10a and 10b can project through the slots 19. The part of the valve plate 13 which makes up section 10c is constructed as a spring tongue 13b, as shown in FIG. 3. The spring tongue 13b provides a permanent flexible abutment of the valve plate 13 against the valve seat 15, and the plate 13 can, if necessary, be supported by an additional leaf spring 20 which is located in a recess 14a of the limit plate 14. By means of the spring tongue 13b, satisfactory guidance of the valve plate 13 is obtained, and lateral deviation is prevented. The spring tongue 13b can be produced from the complete material of the valve plate 13—as shown in the drawings. It is, however, also possible for the spring tongue to be formed from a sheet of spring steel which is firmly connected to the correspondingly shortened valve plate 13 by rivetting or spot-welding. The units 10a and 10b of the outlet valve 10 are secured against shifting on the support surfaces 12 by retaining bolts 22.

As a result of this arrangement of units 10a and 10b an exceptionally small dead volume in the bores 11 and the apertures 16, between the working volume of the chamber 2 and the valve plate 13, is produced, even when the bores have a comparatively large flow cross-section.

In FIG. 4, in which the same reference numbers as in FIG. 2, but with a dash, have been used for identical and similar parts, the square apertures 17' in the limit plate 14' and the valve plate 13', and also the apertures 16' in the valve seat 15', are arranged adjacently and one behind the other in a row, with their side edges parallel to the side edges of the limit plate 14', whereby an area 13a' remains between each of the apertures 17', which covers apertures 16' of the valve seat 15'. The dot-dash lines in the top half of the drawing show the contours of the apertures 17' which rest against the valve seat 15'.

We claim:

1. A rotary compressor, comprising a housing with a curved rotor chamber, a rotor which defines, with the rotor chamber, variable working volumes, an outlet port located in the rotor chamber over which the rotor rides, an outlet passage communicating with the outlet port, a pair of outlet valves located in the outlet passage, and each comprising a valve plate, a limit plate which limits the distance of lift of the valve plate, and a valve seat, the valve plate, limit plate and valve seat defining apertures, the apertures in the valve seat being staggered in relation to those in the valve plate, and in which the outlet port defines a number of passages which are divided into two groups, spaced in the direction of rotation of the rotor, each group being controlled by a separate outlet valve, and two support surfaces for the two outlet valves, into which the bores open, located in the outlet passage close to the rotor chamber, the two support surfaces being inclined to each other and the planes of these surfaces intersect, as seen in cross section, at the apex of the included angle.

2. A rotary compressor according to claim 1, in which the valve plate and valve seat of each outlet valve are combined to form a unit or assembly, each unit having a part extending beyond the apex of the included angle, and in which each part of a respective valve can project or penetrate through the other part.

3. A rotary compressor according to claim 2, in which the part of the valve plate of each outlet valve which extends beyond the apex of the included angle is constructed as a spring tongue and is connected at its free end to the valve seat and the limit plate.

4. A rotary compressor according to claim 1, in which the valve seat consists of a plate which rests against a support surface in the outlet passage, and which has apertures which merge from a circular cross-section adjacent the support surface to a square cross-section adjacent the valve plate.

5. A rotary compressor according to claim 4, in which the apertures of the valve seat, valve plate and limit plate are arranged in a rectangular array, and the diagonals of the square cross-section apertures lie parallel to the side edges of the rectangle.

6. A rotary compressor according to claim 1, in which the valve seat and valve plate each have flat co-operating surfaces.

* * * * *